INVENTORS.
Gustav Spiess
BY Anton Rufli

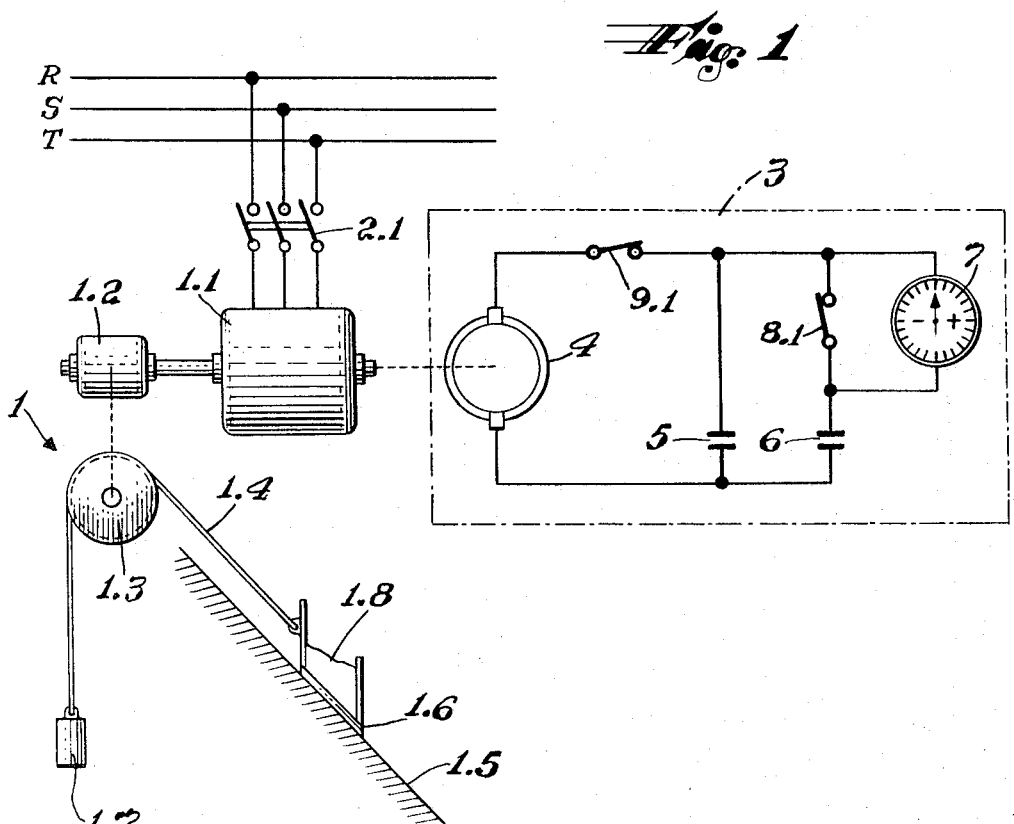
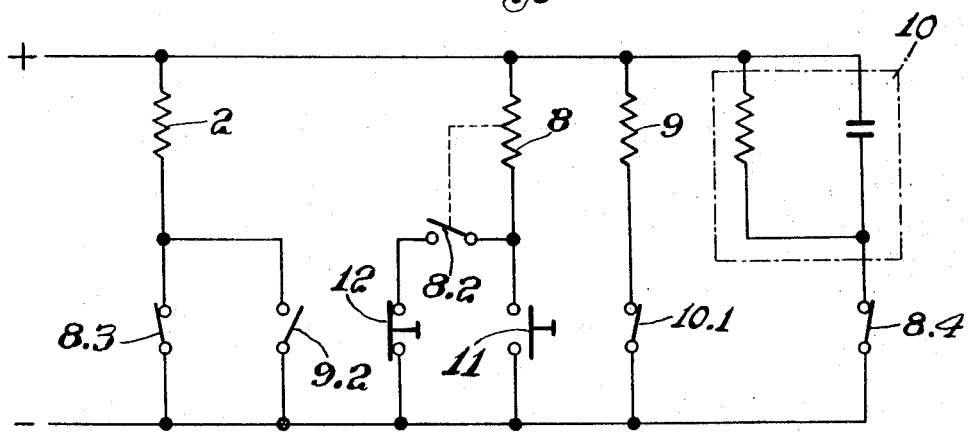

United States Patent Office 3,299,698
Patented Jan. 24, 1967

3,299,698
APPARATUS FOR MEASURING THE LOAD TORQUE ON DRIVE SYSTEMS, ESPECIALLY ON CONVEYING SYSTEMS
Gustav Spiess, Geissmattstr. 21, and Anton Rufli, Wesemlinstr. 69, both of Lucerne, Switzerland
Filed Oct. 16, 1963, Ser. No. 316,691
Claims priority, application Switzerland, Oct. 18, 1962, 12,331/62
2 Claims. (Cl. 73—136)

This invention relates to an apparatus for measuring the load torque in a drive system.

The motor torque and load torque in a drive system are equal and opposite at constant rotary speed. The load torque includes the effective torque resulting from friction, and is variable. It is often desired to know this load torque at a specific moment, for example, for controlling a brake. The object of the invention is the measurement of the load torque occurring in drive systems.

According to the present invention, the load torque is to be measured in such a manner that the measurements are not substantially influenced by fluctuations in motor torque nor by variations in friction, and do not require complicated and expensive arrangements.

With these and other objects in view, the invention resides in measuring the torque of a load on a driven rotating shaft in which the drive of the shaft is deenergized while the shaft is kept connected to the load whereby the rotary speed of the shaft is decreased or increased depending on the nature of the load. A signal is generated in response to the rate of change of the rotary shaft speed, and the signal is indicated as a measure of the load torque.

The speed change may be measured by sensing the rotary speed of the shaft at the beginning and at the end of a predetermined period, and the torque indicating signal may be generated as a function of the difference of the two sensed speeds.

The apparatus includes drive means for rotating the shaft while it is connected to the load, a shut-off for deenergizing the drive means, and a measuring device for measuring the rate of speed change of the shaft in response to the deenergizing of the drive means.

When the drive means is an electrical motor, a contactor interposed between the motor and a source of electric current may be the shut-off. The rate of speed change may be measured by means of a tachometer connected to the shaft and generating a voltage proportional to the rotary speed of the shaft. Two capacitors are switched into connection with the tachometer for predetermined periods at a predetermined interval, and the difference in the charges of the capacitors is indicated as a measure of load torque.

Alternatively, a pulse generator may be coupled to the shaft, and the pulses emitted in two periods at a fixed interval may be stored in two counters, whereby the difference of the counts is a measure of the rate of speed change and of the load torque, and may be indicated as such.

Two examples of measuring apparatus according to the invention are shown in the accompanying drawings wherein:

FIG. 1 shows the drive system of a conveyor equipped with a measuring apparatus of the invention in conventional symbols;

FIG. 2 is the diagram of the control circuit for the measuring apparatus of FIG. 1;

Figure 3:
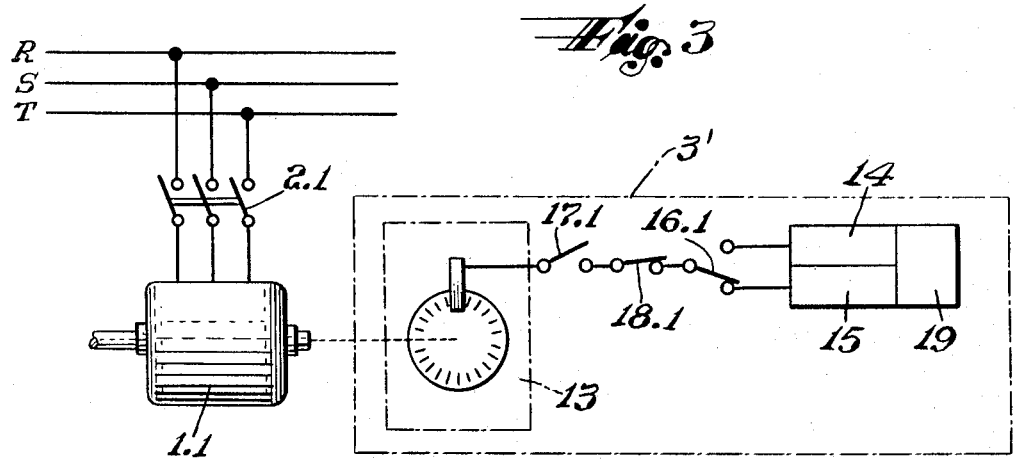
FIG. 3 shows a drive system equipped with a modified measuring apparatus of the invention in the manner of FIG. 1.

FIG. 1 shows a three-phase motor 1.1 whose output shaft drives a conveyor 1 by means of a gear transmission 1.2 and a pulley 1.3, the conveyor being represented by a cable 1.4 trained over the pulley 1.3, a counterweight 1.7 on one end of the cable, and a basket 1.6 attached to the other end of the cable 1.4. The basket 1.6 slides on an inclined plane 1.5 and carries a variable load 1.8. The motor 1.1 is connected to a three-phase A.C. line RST through the normally open contacts 2.1 of a contactor 2 which is seen in FIG. 2.

An acceleration measuring device 3 includes a D.C. tachometer 4 coupled to the shaft of the motor 1.1. The normally closed contacts 9.1 of a relay 9 (see FIG. 2) connect the tachometer with two capacitors 5, 6 arranged in parallel circuits. A voltmeter 7 in series with the capacitor 6 is shunted by the normally closed contacts 8.1 of a relay 8 (see FIG. 2).

As seen in FIG. 2, a direct current source is connected to the contactor 2, the relays 8, 9, and to a time-delay switch 10. The relay 8 operates the afore-mentioned contacts 8.1, holding contacts 8.2, normally closed contacts 8.3 in series with the contactor 2, and normally closed contacts 8.4 in the control circuit of the time-delay switch 10. A circuit-closing push button switch 11 is arranged in the energizing circuit of the relay 8, and a circuit-opening push button switch 12 is arranged in the holding circuit of the relay 8. The relay 9 operates the afore-mentioned contacts 9.1 and normally open contacts 9.2 arranged in parallel with the contacts 8.3. The normally closed contacts 10.1 of the time delay switch 10 control the energizing circuit of the relay 9.

The afore-described apparatus operates as follows:

When the direct current source (FIG. 2) is switched on, the contactor 2 and the time delay switch 10 are energized. The drive motor 1.1 is started when the contacts 2.1 are closed. The tachometer 4 produces direct current voltage proportional to the rotary speed of the motor 1.1 and the capacitors 5, 6 are charged accordingly. The voltmeter 7 reads zero.

When it is desired to measure the load torque, the push button switch 11 is operated, whereby the relay 8 is energized and is held thereafter by its contacts 8.2. The contacts 8.1 and 8.3 open, thereby deenergizing the contactor 2 and shutting off the power supply to the motor 1.1, and deenergizing the time delay switch 10. The contacts 8.1 are opened and the high-resistance voltmeter 7 is interposed in series between the capacitor 6 and the tachometer 4.

If the load torque applied to the shaft of the deenergized motor 1.1 is different from zero, the shaft is accelerated or decelerated, and the capacitor 5 is charged to a correspondingly higher or lower voltage than the capacitor 6 which maintains the original voltage for the periods relevant to this discussion.

When the delay of the switch 10 is over, the contacts 10.1 energize the relay 9, the contacts 9.1 are opened to separate the capacitor 5 from the tachometer 4, and the contacts 9.2 energize the contactor 2, whereby the motor is again supplied with power. The voltmeter 7 shows the voltage difference between the capacitors 5 and 6 which is a direct measure of the load torque. The apparatus is returned to its initial condition by operating the push button switch 12.

Figure 4:
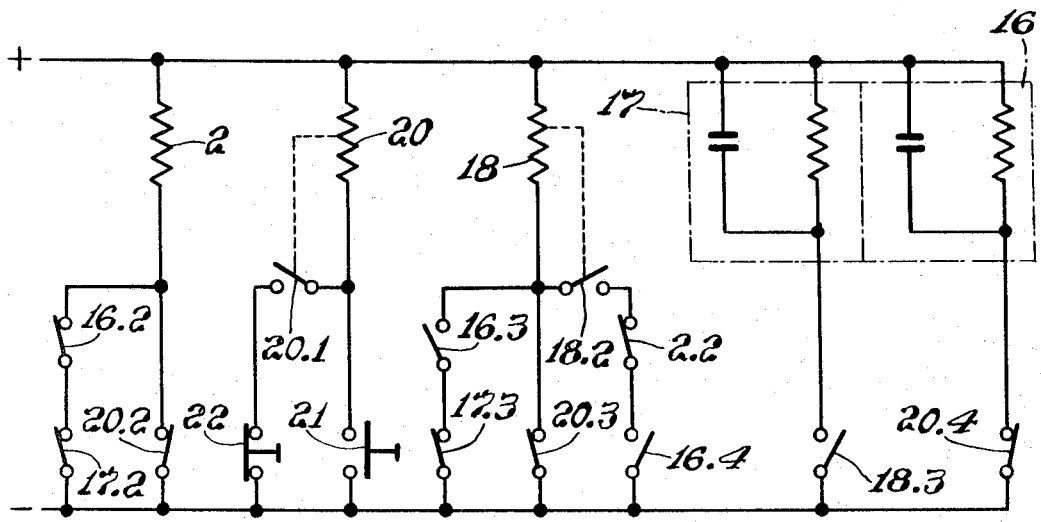
FIG. 4 is the diagram of the control circuit for the measuring apparatus of FIG. 3.

The apparatus shown in FIGS. 3 and 4 differs from the first-described apparatus by an acceleration measuring device 3' which includes a conventional photoelectric pulse generator 13 which produces a sequence of pulses at a frequency proportional to the rotary speed of the drive motor 1.1 with whose shaft it is coupled. Two pulse counters 14, 15 may be connected alternatively to the generator 13 by transfer contacts 16.1 of a first time delay switch 16 (FIG. 4). Normally open contacts 17.1 of a second time delay switch 17 (FIG. 4) and normally closed contacts 18.1 of a relay 18 are interposed in series between the generator 13 and the transfer contacts 16.1. An indicator 19 shows the difference of the counts of the counters 14, 15. The latter may be reset to zero in a conventional manner (not shown).

As seen in FIG. 4, the contactor 2 for the motor 1.1, the time delay switches 16, 17, the afore-mentioned relay 18, and an additional relay 20 are energized by a common D.C. source. The time delay of the switch 17 is shorter than that of the switch 16. The contactor 2 has normally open contacts 2.1 in the power supply circuit of the motor 1.1 and normally closed contacts 2.2 in a holding circuit of the relay 18. The relay 20 has holding contacts 20.1 and normally closed contacts 20.2, 20.3, and 20.4 which normally energize the contactor 2, the relay 18, and the time switch 16 respectively. A normally open push button switch 21 in the energizing circuit of the relay 20 starts measurement operation, and a normally closed push button switch 22 in the holding circuit of the relay 20 resets the apparatus to its initial condition.

The relay 18 operates the afore-mentioned contacts 18.1, holding contacts 18.2 and normally open contacts 18.3 in the energizing circuit of the time delay switch 17. The time delay switch 17 operates the afore-mentioned normally open contacts 17.1, and two sets of normally closed contacts 17.2, 17.3 in energizing circuits of the contactor 2 and the relay 18 respectively. The time delay switch 16 operates the transfer contacts 16.1, normally closed contacts 16.2 in series with the afore-mentioned contacts 17.2, and normally open sets of contacts 16.3, 16.4 in series with the contacts 17.3 and 2.2 respectively.

The apparatus shown in FIGS. 3 and 4 is operated as follows:

When the contactor 2 is energized, the motor 1.1 is started. The time delay switches 16, 17 and the relay 18 are simultaneously energized. The pulse generator 13 emits pulses at a frequency proportional to the rotary speed of the motor 1.1. The contacts 17.1 are closed, but the contacts 18.1 are open. The transfer contacts 16.1 connect the counter 14 to the open contacts 18.1. Both counters 14, 15 read zero.

When the push button switch 21 is operated, the relay 20 is energized, and is held energized by the contacts 20.1 when the push button switch 21 is released. The contacts 20.4 open and deenergize the time delay switch 16. The opening of the contacts 20.2 and 20.3 deenergizes the contactor 2 and the relay 18. The current supply to the motor 1.1 is interrupted, the time delay switch 17 is deenergized, and the pulse generator 13 is connected to the counter 14 which counts the pulses received.

When the switch 17 opens its contacts 17.1 after the delay, the pulse generator 13 is disconnected from the counter 14. The closing contacts 17.3 simultaneously energize the relay 18 which is thereafter held by its holding circuit 18.2, 2.2, 16.4 and whose contacts 18.3 again energize the switch 17.

When the switch 16 shifts the transfer contacts 16.1 after the delay set to the pulse counter 15, the contacts 16.4 interrupt the holding circuit of the relay 18, whereupon the contacts 18.3 deenergize the time delay switch 17. The contacts 18.1 connect the pulse generator 13 to the counter 15, and the pulses received are counted.

After the time set for the switch 17 elapses, the contact 17.1 interrupts the connection of the pulse generator 13 with the counter 15, and the contacts 17.2 close the energizing circuit of the contactor 2, whereby the motor is again connected to its current supply, and the measuring operation is terminated.

The difference between the counts of the two counters 14, 15 is shown on the indicator 19 and is a direct measure of the load torque acting on the motor 1.1. When the push button 22 is operated, the measuring apparatus is returned to its initial condition.

The readings of the afore-described measurement devices may be employed directly for the control of a brake, for example. This is advantageous in the drives of railroads, elevators, or machine tools wherever it is necessary to stop movement at a precisely determined point. The timing or force of brake action may be controlled as a function of the values measured by the apparatus of the invention, that is, as a function of load torque.

It should be understood that the invention is not limited to the specific embodiments described hereinabove and illustrated in the drawing, but is defined solely by the scope and spirit of the appended claims.

We claim:
1. An apparatus for measuring the torque of a load on a shaft comprising, in combination:
 (a) drive means for rotating said shaft while connected to said load;
 (b) shut-off means for deenergizing said drive means; and
 (c) measuring means for measuring the rate of speed change of said shaft in response to said deenergizing; said measuring means including
  (1) tachometer means connected to said shaft for generating a voltage proportional to the rotary speed of the shaft;
  (2) two capacitors;
  (3) switch means for respectively connecting said capacitors to said tachometer for predetermined periods at a predetermined interval; and
  (4) indicator means for indicating the difference in the charges of said capacitors.
2. An apparatus for measuring the torque of a load on a shaft comprising, in combination:
 (a) drive means for rotating said shaft while connected to said load;
 (b) shut-off means for deenergizing said drive means; and
 (c) measuring means for measuring the rate of speed change of said shaft in response to said deenergizing; said measuring means including
  (1) a pulse generator coupled to said shaft for producing a sequence of pulses at a frequency proportional to the rotary speed of said shaft;
  (2) two pulse counters;
  (3) switch means for connecting said counters to said pulse generator for predetermined respective periods at a fixed interval; and
  (4) indicator means for indicating the difference of the counts of said counters.

References Cited by the Examiner
UNITED STATES PATENTS

| | | | |
|---|---|---|---|
| 2,645,755 | 10/1962 | Deane | 73—9 |
| 3,059,464 | 10/1962 | Deane | 73—9 |
| 3,116,628 | 1/1964 | Gordon | 73—9 |

RICHARD C. QUEISSER, *Primary Examiner.*

CHARLES A. RUEHL, *Assistant Examiner.*